(12) United States Patent
Coq et al.

(10) Patent No.: US 12,244,172 B2
(45) Date of Patent: Mar. 4, 2025

(54) BACKUP POWER ALLOCATION MANAGEMENT

(71) Applicant: International Business Machines Corporation, Armonk, NY (US)

(72) Inventors: Marc Henri Coq, Hopewell Junction, NY (US); Richard John Fishbune, Rochester, MN (US); Mark E. Maresh, Oro Valley, AZ (US); Eric B. Swenson, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 17/656,239

(22) Filed: Mar. 24, 2022

(65) Prior Publication Data

US 2023/0307941 A1    Sep. 28, 2023

(51) Int. Cl.
*H02J 9/06* (2006.01)
*G05B 15/02* (2006.01)

(52) U.S. Cl.
CPC .............. *H02J 9/06* (2013.01); *G05B 15/02* (2013.01)

(58) Field of Classification Search
CPC ................................. H02J 9/06; G05B 15/02
See application file for complete search history.

(56) References Cited

U.S. PATENT DOCUMENTS

| 6,067,030 | A  | 5/2000  | Burnett  |
|-----------|----|---------|----------|
| 7,085,626 | B2 | 8/2006  | Harrod   |
| 7,233,127 | B2 | 6/2007  | Chen     |
| 7,340,325 | B2 | 3/2008  | Sousa    |
| 8,471,406 | B2 | 6/2013  | Patel    |
| 9,735,613 | B2 | 8/2017  | Orthlieb |
| 10,391,638 | B2 | 8/2019 | Angle    |
| 10,431,996 | B2 | 10/2019 | Liu     |

(Continued)

FOREIGN PATENT DOCUMENTS

| CN | 104885025 B  | 6/2017  |
|----|--------------|---------|
| JP | 2017532653 A | 11/2017 |

OTHER PUBLICATIONS

International Search Report, International Application No. PCT/IB2023/050862, Jun. 8, 2023, 7 pgs.

(Continued)

*Primary Examiner* — Ziaul Karim
(74) *Attorney, Agent, or Firm* — Aaron N. Pontikos

(57) ABSTRACT

A method can include obtaining device data for a set of electronic devices. The device data can indicate power utilized by the set of electronic devices. The method can include obtaining a capacity of a backup power source. The method can include obtaining priority data regarding an allocation of power to the set of electronic devices. The method can include obtaining a set of environmental conditions. The method can include calculating, based at least in part on the set of environmental conditions and the device data, a projected electrical load on the backup power source. The method can include determining that one or more thresholds are exceeded. The determining can comprise identifying that the projected electrical load exceeds the capacity. The method can include modifying, in response to the determining and according to the priority data, power supplied to the set of electronic devices from the backup power source.

21 Claims, 5 Drawing Sheets

(56) References Cited

U.S. PATENT DOCUMENTS

| | | | |
|---|---|---|---|
| 10,606,330 | B2 | 3/2020 | Maheswaran |
| 10,840,735 | B1 | 11/2020 | Cooper |
| 11,088,547 | B1 | 8/2021 | Goergen |
| 2003/0075982 | A1 | 4/2003 | Seefeldt |
| 2007/0205745 | A1 | 9/2007 | Chen |
| 2009/0144577 | A1 | 6/2009 | Sarker |
| 2009/0171862 | A1 | 7/2009 | Harrod |
| 2012/0306270 | A1 | 12/2012 | Oh |
| 2013/0042005 | A1 | 2/2013 | Boss et al. |
| 2013/0293015 | A1* | 11/2013 | Wu .................... H02J 9/00 307/64 |
| 2015/0094968 | A1* | 4/2015 | Jia .................... G05B 15/02 702/60 |
| 2015/0227181 | A1* | 8/2015 | Khessib ............. G06F 1/3203 713/300 |
| 2015/0270743 | A1* | 9/2015 | Orthlieb ............... H02J 9/06 165/200 |
| 2016/0109865 | A1* | 4/2016 | Bojorges Rodríguez .................... G01R 21/133 700/275 |
| 2017/0006135 | A1* | 1/2017 | Siebel ................. H04L 69/40 |
| 2018/0171987 | A1* | 6/2018 | Yao ..................... H02J 7/34 |
| 2019/0081813 | A1* | 3/2019 | Nistane ............. H04L 12/2823 |
| 2019/0303830 | A1* | 10/2019 | Wenzel ................ H02J 3/14 |
| 2020/0271342 | A1 | 8/2020 | Steinberg |
| 2021/0157312 | A1* | 5/2021 | Cella ................. G01M 13/045 |

OTHER PUBLICATIONS

Leng et al., "Effect of Temperature on the Aging rate of Li Ion Battery Operating above Room Temperature", Scientific Reports, 5:12967 doi: 10.1038/SREP12967, Aug. 6, 2015, 12 Pgs, <www.nature.com/scientificreports>.

Mell et al., "The NIST Definition of Cloud Computing", National Institute of Standards and Technology, Special Publication 800-145, Sep. 2011, 7 pages.

Swenson Et A., "Battery Management for Performing a Final Action", U.S. Appl. No. 17/303,599, filed Jun. 3, 2021, 40 Pgs.

* cited by examiner

BACKUP POWER ALLOCATION MANAGEMENT

BACKGROUND

The present disclosure relates to backup power, and more specifically, to backup power allocation management.

Backup power sources, such as fuel generators and batteries, can be employed to supply power to one or more electronic devices in the event of a power outage. A duration of available backup power from a backup power source can depend on a capacity of the backup power source and an electrical load on the backup power source.

SUMMARY

According to embodiments of the present disclosure, a method can include obtaining device data for a set of electronic devices. The device data can indicate power utilized by the set of electronic devices. The method can include obtaining a capacity of a backup power source. The backup power source can be configured to supply power to the set of electronic devices. The method can include obtaining priority data corresponding to an allocation of power to the set of electronic devices. The method can include obtaining a set of environmental conditions. The method can include calculating, based at least in part on the set of environmental conditions and the device data, a projected power capacity of the backup power source. The method can include determining that one or more thresholds are exceeded. The determining can comprise identifying that the projected power capacity exceeds a first threshold. The method can include modifying, in response to the determining and according to the priority data, power supplied to the set of electronic devices from the backup power source.

A system and a computer program product corresponding to the above method are also included herein.

According to embodiments of the present disclosure, a method can include obtaining device data for a set of electronic devices. The device data can indicate power utilized by the set of electronic devices. The method can include obtaining a capacity of a set of solar panels configured to supply power to the set of electronic devices. The method can include obtaining priority data corresponding to an allocation of power to the set of electronic devices. The method can include obtaining a weather forecast. The method can include calculating, based at least in part on the weather forecast and the device data, a projected power capacity of the set of solar panels. The method can include determining that the projected power capacity exceeds a threshold. The method can include modifying, in response to the determining and according to the priority data, power supplied to the set of electronic devices from the set of solar panels.

According to embodiments of the present disclosure, a method can include obtaining device data for a set of electronic devices. The device data can indicate power utilized by the set of electronic devices. The method can include obtaining a capacity of a backup power source configured to supply power to the set of electronic devices. The method can include obtaining priority data corresponding to an allocation of power to the set of electronic devices. The method can include obtaining a projected power outage time. The method can include calculating, based at least in part on the projected power outage time and the device data, a projected power capacity of the backup power source. The method can include determining that the projected power capacity exceeds a threshold. The method can include modifying, in response to the determining and according to the priority data, power supplied to the set of electronic devices from the backup power source. The modifying can be based at least in part on the projected power outage time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
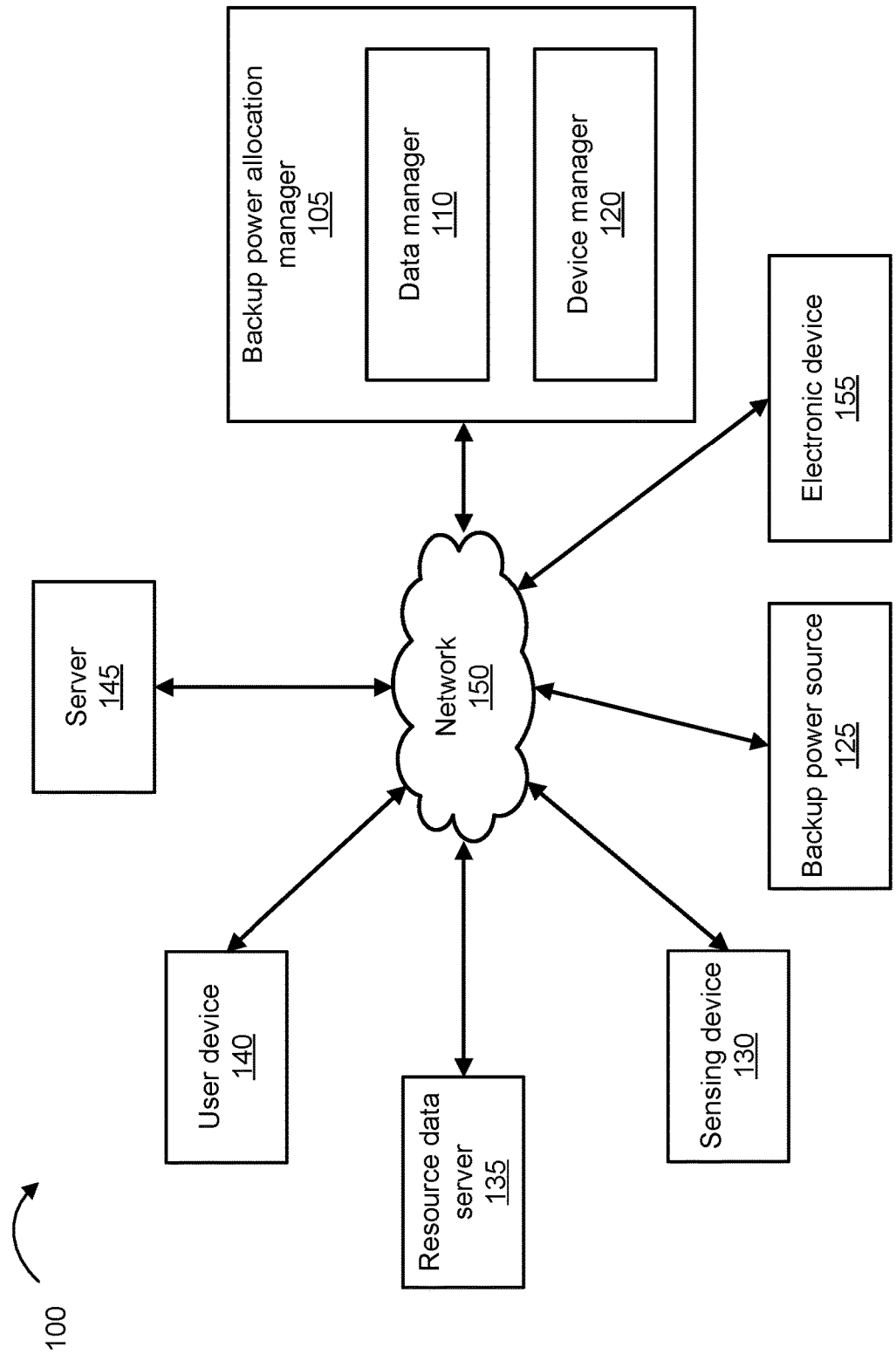
FIG. 1 depicts an example computing environment having a backup power allocation manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to backup power; more particular aspects relate to backup power allocation management. While the present disclosure is not necessarily limited to such applications, various aspects of the disclosure may be appreciated through a discussion of various examples using this context.

Backup power sources can include devices such as fuel generators, batteries, solar grids, wind turbines, and/or hydraulic turbines. Such backup power sources can be employed to supply power to one or more electronic devices in response to a disruption in power from a primary power source, such as an electrical grid. A duration of available backup power from a backup power source can depend on a capacity of the backup power source and an electrical load on the backup power source. In some instances, such capacity and/or electrical load can be affected by environmental conditions, such as ambient temperature and/or humidity, wind speed, and/or an available quantity of fuel (e.g., diesel fuel for a diesel fuel generator). Additionally, in many instances, a duration of a disruption in power from a primary power source (e.g., a power outage) can be unknown. Accordingly, providing sufficient backup power to electronic devices for a duration of a power outage and in view of dynamic environmental conditions can present challenges.

To address these and other challenges, embodiments of the present disclosure include a backup power allocation manager. In some embodiments, the backup power allocation manager can modify an allocation of power to one or more electronic devices based on monitored environmental conditions and a set of predetermined priority ratings. By accounting for dynamic environmental conditions, embodiments of the present disclosure can autonomously increase a duration of available backup power from one or more backup power sources. Additionally, by utilizing a set of predetermined priority ratings, embodiments of the present disclosure can autonomously tailor performance by one or more backup power sources according to a user's interests.

Turning to the figures, FIG. 1 illustrates a computing environment 100 that includes one or more of each of a backup power allocation manager ("BPAM") 105, an electronic device 155, a backup power source 125, a sensing device 130, a resource data server 135, a user device 140, a server 145, and/or a network 150. In some embodiments, at least one BPAM 105, electronic device 155, backup power source 125, sensing device 130, resource data server 135, user device 140, and/or server 145 can exchange data with at least one other through the at least one network 150. One or more of each of the BPAM 105, electronic device 155, backup power source 125, sensing device 130, resource data server 135, user device 140, server 145, and/or network 150 can include a computer system, such as computer system 301 discussed with respect to FIG. 3.

In some embodiments, the BPAM 105 can be included in software installed on a computer system of at least one of the electronic device 155, backup power source 125, sensing device 130, user device 140, and/or server 145. The BPAM 105 can include program instructions implemented by a processor, such as a processor of a user device 140, to perform one or more operations discussed with respect to FIG. 2.

In some embodiments, the BPAM 105 can include one or more modules, such as data manager 110 and/or device manager 120. In some embodiments, the data manager 110 and the device manager 120 can be integrated into a single module. In some embodiments, the data manager 110 can obtain, interpret, analyze, store, and/or initiate storage of data. In some embodiments, the device manager 120 can issue commands to one or more devices, such as the one or more electronic devices 155. In some embodiments, the data manager 110 and/or device manager 120 can include program instructions implemented by a processor, such as a processor of backup power source 125, to perform one or more operations discussed with respect to FIG. 2. For example, in some embodiments, the data manager 110 can include program instructions to perform operations 205-235. In some embodiments, the device manager 120 can include program instructions to perform operation 240. In some embodiments, the BPAM 105 can automatically and intermittently perform one or more operations discussed with respect to FIG. 2.

In some embodiments, the one or more electronic devices 155 can include one or more devices that operates using electrical power. For example, in some embodiments, the one or more electronic devices can include household items, such as computers, refrigerators, freezers, security alarm systems, HVAC systems, lamps, fans, and the like. In some embodiments, the one or more electronic devices can include equipment such as servers, routers, monitors, and the like.

In some embodiments, the one or more backup power sources 125 can include devices such as batteries, fuel generators, solar grids, and/or turbines. In some embodiments, the one or more sensing devices 130 can include devices such as temperature sensors, humidity sensors, and the like. In some embodiments, the at least one resource data server 135 can include one or more web servers. In some embodiments, the at least one resource data server 135 can store data such as device data, environmental conditions, and/or data corresponding to projected power capacities of electronic devices 155. In some embodiments, the at least one user device 140 can include a device such as a notebook computer, tablet, desktop computer, mobile phone (e.g., a "smartphone"), tablet, wearable technology (e.g., a "smartwatch"), and the like. In some embodiments, a user, such as an owner and/or custodian of a user device 140 can transmit data, such as priority data, from the user device 140 to the BPAM 105. In some embodiments, server 145 can include a web server.

In some embodiments, the network 150 can be a wide area network (WAN), a local area network (LAN), the internet, or an intranet. In some embodiments, the network 150 can be substantially similar to, or the same as, cloud computing environment 50 discussed with respect to FIG. 4.

In some embodiments, the at least one backup power source 125 can include at least one device configured to provide a backup power. In some embodiments, such a device can be employed and a residential and/or a commercial facility.

Figure 2:
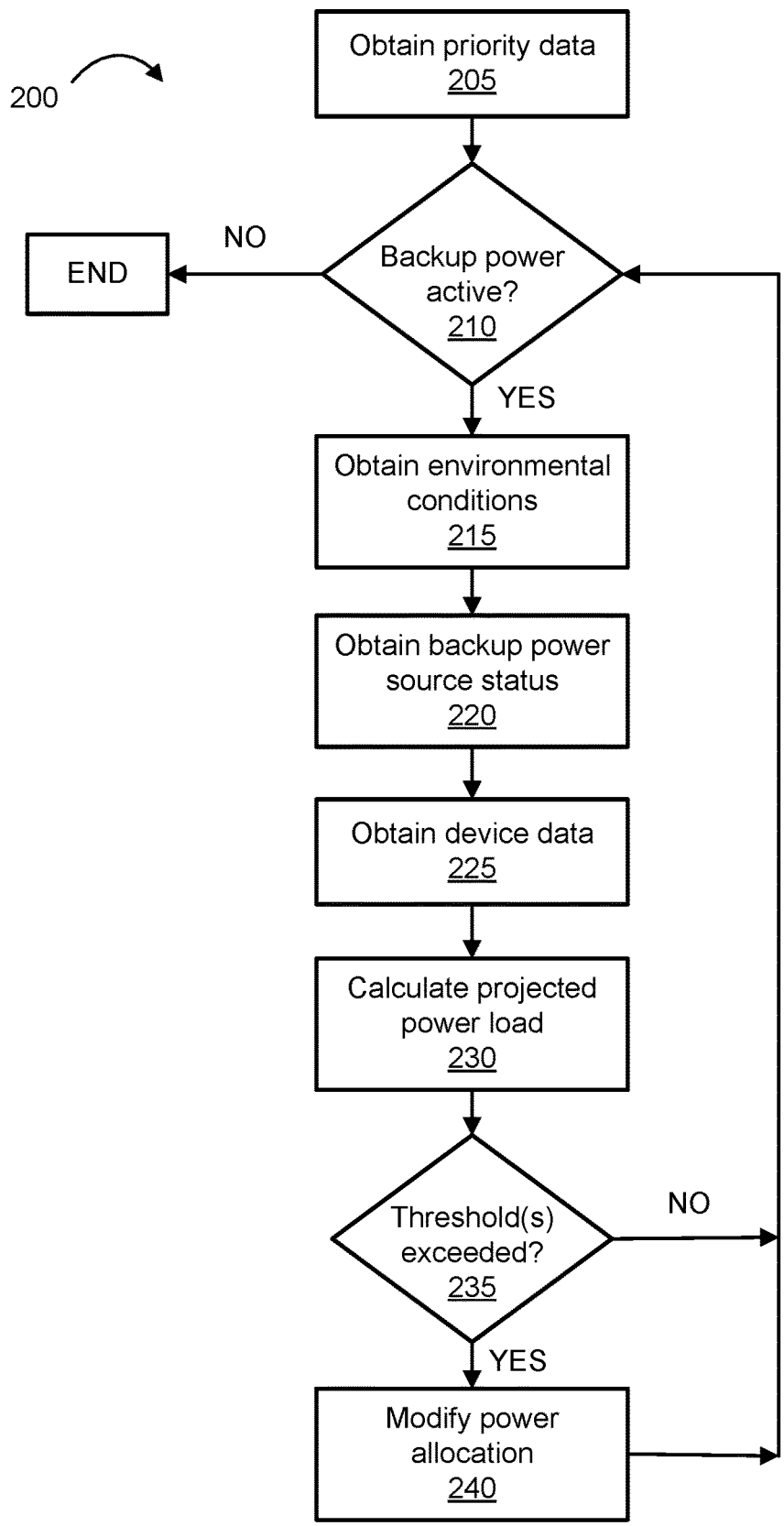
FIG. 2 depicts a flowchart of an example method for performing backup power allocation management, in accordance with embodiments of the present disclosure.

FIG. 2 illustrates a flowchart of an example method 200 for managing backup power allocation, in accordance with embodiments of the present disclosure. The method 200 can be performed by a BPAM, such as the BPAM 105, FIG. 1.

Referring back to FIG. 2, in operation 205, the BPAM can obtain priority data. In some embodiments, priority data can indicate a degree of priority/importance of one or more tasks associated with an electronic device. In some embodiments, priority data can include one or more priority ratings and/or thresholds. For example, in some embodiments, priority data can include the information shown in TABLE 1 below.

TABLE 1

| Device | Priority Rating | | | |
|---|---|---|---|---|
|  | 1 | 2 | 3 | 4 |
| HVAC: Heating @desired T | Pipe freezing (if Tinside <45 F.) |  |  |  |
| HVAC: Cooling @desired T | Pets in house (If Tinside is >80 F.) |  |  |  |
| Freezer |  |  |  | If Tfreezer is >25 F. |

TABLE 1-continued

| | Priority Rating | | | |
|---|---|---|---|---|
| Device | 1 | 2 | 3 | 4 |
| Refrigerator | | | | If Trfrig is >45 F. or Tfreezer is >25 F. |
| Security Alarm | | Supply backup power when alarm battery <40% | | |

TABLE 1 shows a set of household devices to be modified by the BPAM according to a set of priority ratings and a set of thresholds. The priority ratings 1, 2, 3, and 4 indicate a priority of a task, in order of a highest degree of priority/importance (i.e., priority rating 1) to a least degree of priority/importance (i.e., priority rating 4). Accordingly, in the event that one or more backup power sources are employed to supply power to the set of household devices, the BPAM can allocate the power supplied to the devices such that tasks having a priority rating 1 can be performed prior to tasks having a priority rating 2, 3, or 4; tasks having a priority rating 2 can be performed prior to tasks having a priority rating 3 or 4; and tasks having a priority rating 3 can be performed prior to tasks having a priority rating 4. Accordingly, because the tasks of heating and cooling by the household heating, ventilation, and air conditioning ("HVAC") system has a priority rating 1, in the event of a power outage, the BPAM can allocate power to the HVAC system before it allocates power to the freezer, refrigerator, or the security alarm.

TABLE 1 also shows a set of thresholds corresponding to the tasks performed by the devices. For example, in some embodiments, to prevent pipe freezing, the BPAM can allocate power for the task of heating by the HVAC system in response to an inside temperature of the house falling below 45° F. In some embodiments, to provide a comfortable environment for pets, the BPAM can allocate power for the task of cooling by the HVAC system in response to an inside temperature of the house exceeding 80° F. In some embodiments, to maintain an active household security alarm system, the BPAM can allocate power to the security alarm system in response to a battery of the security alarm system falling below a 40% capacity. In some embodiments, to preserve frozen foods, the BPAM can allocate power to activate the freezer in response to a temperature of the freezer exceeding 25° F. (thereby enabling the freezer to decrease the temperature). In some embodiments, for food preservation, the BPAM can allocate power to activate the refrigerator in response to a temperature of the refrigerator exceeding 45° F. (thereby enabling the refrigerator to decrease the temperature). As discussed in more detail below, the BPAM can continuously and/or intermittently monitor environmental conditions, such as the inside temperature of the house, and allocate power based, at least in part, on such environmental conditions. For example, in the event of a power outage, the BPAM can determine at a first time that an inside temperature of the house does not exceed the thresholds for the priority 1 tasks of heating or cooling. Accordingly, at the first time, the BPAM can proceed to analyzing the priority 2 task of supplying power to the security alarm system and determine that the threshold is exceeded. Thus, at the first time, the BPAM can allocate power to the security alarm system to charge the battery.

Further in this example, at a second time, the BPAM can determine that an inside temperature of the house does exceed a threshold for heating. Accordingly, at the second time, the BPAM can allocate power for the task of heating by the HVAC system. Subsequently, at the second time, the BPAM can proceed to analyze the priority of the task of supplying power to the security alarm system and determine that the threshold is no longer exceeded. Thus, at the second time, the BPAM can terminate the allocation of power to the security alarm system. Accordingly, embodiments of the present disclosure can account for dynamic environmental conditions and account for a user's priorities when managing backup power allocation.

In some embodiments, priority data can include a designation of "critical" or "non-critical" for electronic devices and/or tasks. In these embodiments, a "critical" designation can indicate that the corresponding electronic device and/or task is to be prioritized, and a "non-critical" designation can indicate that the corresponding electronic device and/or task is not to be prioritized. For example, in some embodiments, a set of electronic devices can include a set of servers in a data center. In this example, a first server of the set of servers can have the "critical" designation, and a second server of the set of servers can have the "non-critical" designation. In this example, in the event of a power outage, the BPAM can be configured to maintain a quantity of power allocated to the first server and to reduce a quantity of power allocated to the second server, based, at least in part, on the respective designations. Additionally, in some embodiments, the BPAM can reduce the quantity of power allocated to the second server by reducing one or more processing speeds of the second server. In some embodiments, the BPAM can reduce the quantity of power allocated to the second server by powering off the second server.

In some embodiments, priority data can include a set of thresholds corresponding to the projected power capacity calculated in operation 230. For example, in some embodiments, a threshold can include a total electrical load threshold. In some embodiments, a threshold can include a duration of available backup power threshold. In some embodiments, priority data can include a set of thresholds corresponding to one or more environmental conditions obtained in operation 215.

In some embodiments, the BPAM can obtain priority data by user input. For example, in some embodiments, a user can select priorities and/or thresholds for tasks and/or electronic devices through a user device (e.g., user device 140, FIG. 1). In this example, the user can transmit the selected priorities and/or thresholds to the BPAM through a network (e.g., network 150, FIG. 1).

In operation 210, the BPAM can determine if a backup power source is active. In some embodiments, a backup power source can be deemed active in response to the backup power source providing power to one or more electronic devices. In some embodiments, operation 210 can include the BPAM obtaining data from a user, through a user device, indicating that one or more backup power sources are active. In some embodiments, operation 210 can include the BPAM obtaining data from one or more backup power sources indicating that the one or more backup power sources are active.

In operation 210, if the BPAM determines that no backup power sources are active, then method 200 can end. Alternatively, if the BPAM determines that one or more backup power sources are active, then the BPAM can proceed to operation 215.

In operation 215, the BPAM can obtain one or more environmental conditions. Operation 215 can include the BPAM obtaining data regarding information such as ambient temperatures (e.g., indoor and/or outdoor temperatures); a weather season; a weather forecast (e.g., a projected degree or amount of cloudiness, sunshine, wind, tide, and/or humidity); and/or a location of a backup power source and/or an electronic device. In some embodiments, the one or more environmental conditions can include information such as a remaining quantity of fuel available to a fuel generator. In some embodiments, the remaining quantity of fuel can include a quantity of fuel stored in a tank of the fuel generator. In some embodiments, the remaining quantity of fuel can include a quantity of fuel that can be delivered to the fuel generator by a supplier. In some embodiments, the one or more environmental conditions can include information such as a projected duration of a disruption in power, such as a power outage.

In some embodiments, operation 215 can include the BPAM obtaining one or more environmental conditions from a sensing device, a resource data server, a backup power source, and/or a user device.

In operation 220, the BPAM can obtain a status of one or more backup power sources. In some embodiments, obtaining a status of a backup power source can include obtaining information about a capacity of the backup power source to provide power. For example, in some embodiments, a status of a backup power source can include a remaining charge of a battery. In some embodiments, a status of a backup power source can be based on environmental conditions. For example, in some embodiments, a status of a backup power source can be based on a remaining quantity of fuel available to a fuel generator. In some embodiments, a status of a backup power source can be based on a quantity of sunlight available to one or more solar panels and/or a velocity of fluid (e.g., wind and/or water) available to a turbine. In some embodiments, a status of a backup power source can be based on current conditions (e.g., a velocity of wind at a present time) and/or future conditions (e.g., a projected velocity of wind over a 3-hour duration beginning with a present time). In some embodiments, the BPAM can obtain a status of a backup power source from the backup power source (e.g., a backup power source can transmit such data to the BPAM). In some embodiments, the BPAM can calculate a status of a backup power source based on environmental condition data (e.g., the BPAM can calculate a quantity of power that can be generated by a wind turbine that receives a predetermined velocity of wind over a predetermined quantity of time).

In operation 225, the BPAM can obtain device data. Device data can indicate a quantity of power that can be used by an electronic device (e.g., electronic device 155, FIG. 1) when the electronic device is operating. Accordingly, device data can indicate an electrical load that the electronic device can place on a backup power source. For example, in some embodiments, an operating refrigerator can use 800 Watts (W) of power and an operating air conditioner can use 5000 (W) of power. In some embodiments, the BPAM can obtain device data from an electronic device (e.g., electronic device 155, FIG. 1). In some embodiments, the BPAM can obtain device data from a resource such as a database of stored electronic device specifications and/or usage information. Such a database can be stored on a server (e.g., resource data server 135, FIG. 1). For example, in some embodiments, a web server can store a set of tables that specify a set of electrical loads generated by an air conditioning unit. The set of electrical loads can correspond to a set of respective temperature values and humidity values of air cooled by the air conditioning unit. Accordingly, in this example, the BPAM can employ such tables to obtain an electrical load generated by the air conditioning unit associated with specific environmental conditions (i.e., a specific air temperature and a specific humidity).

In operation 230, the BPAM can calculate a projected power capacity based, at least in part, on environmental conditions obtained in operation 215, a status obtained in operation 220, and/or device data obtained in operation 225. In some embodiments, a projected power capacity can include a duration of available backup power from a backup power source. For example, in some embodiments, a projected power capacity can include a projected quantity of time during which a fuel generator can provide power to both a refrigerator and an air conditioning unit when an outdoor temperature is 95° F. with 80% humidity. In some embodiments, the BPAM can calculate such a duration by summing the electrical loads of the electronic devices configured to receive power from a backup power source to find a total electrical load of the set of electronic devices on the backup power source. In some embodiments, the BPAM can access a resource that includes a set of durations, such as a stored data table corresponding to the backup power source. In these embodiments, the stored data table can correlate total electrical loads with respective durations of backup power by the backup power source. Such a data table can be stored on a server (e.g., resource data server 135, FIG. 1). In some embodiments, the BPAM can calculate a duration of available backup power (D) using a formula such as: $D=C*V/TL$ (where C is a battery capacity in ampere-hours, V is an input voltage, and TL is a total electrical load, in Watts, on the battery from a set of electronic devices).

In operation 235, the BPAM can determine whether one or more thresholds are exceeded. For example, in some embodiments, a threshold temperature can be exceeded when an internal refrigerator temperature is greater than a threshold of 45° F. In some embodiments, a duration of available backup power can exceed a threshold when the duration is less than a threshold time, such as 3 hours. In some embodiments, a total electrical load can exceed a threshold when the total electrical load is greater than a value, such as 5 kW (kilowatts).

In operation 235, in some embodiments, if the BPAM determines that one or more thresholds are exceeded, then method 200 can proceed to operation 240. Alternatively, if the BPAM determines that one or more thresholds are not exceeded, then the BPAM can proceed to operation 210.

In operation 240, the BPAM can modify an allocation of backup power from one or more backup power sources to one or more electronic devices. In some embodiments, operation 240 can include the BPAM adjusting an electronic device to reduce an electrical load of the electronic device. For example, in some embodiments, the BPAM can adjust a thermostat to reduce an output temperature of a heating system, such that the heating system generates a reduced electrical load on a backup power source. In some embodiments, the BPAM can adjust one or more processing speeds associated with a server, such that the server generates a reduced electrical load on a backup power source. In some embodiments, the BPAM can power off an electronic device, such as a refrigerator, to reduce an electrical load on a backup power source. Similarly, in some embodiments, operation 240 can include the BPAM adjusting an electronic device to increase an electrical load of the electronic device on a backup power source. For example, in some embodiments, the BPAM can power on an electrical device, such as a freezer. In some embodiments, the BPAM can modify an allocation of backup power by activating or deactivating a power connection for a device. For example, in some embodiments, the BPAM can turn off a refrigerator by turning off a circuit breaker for a socket where the refrigerator is plugged in.

Figure 3:
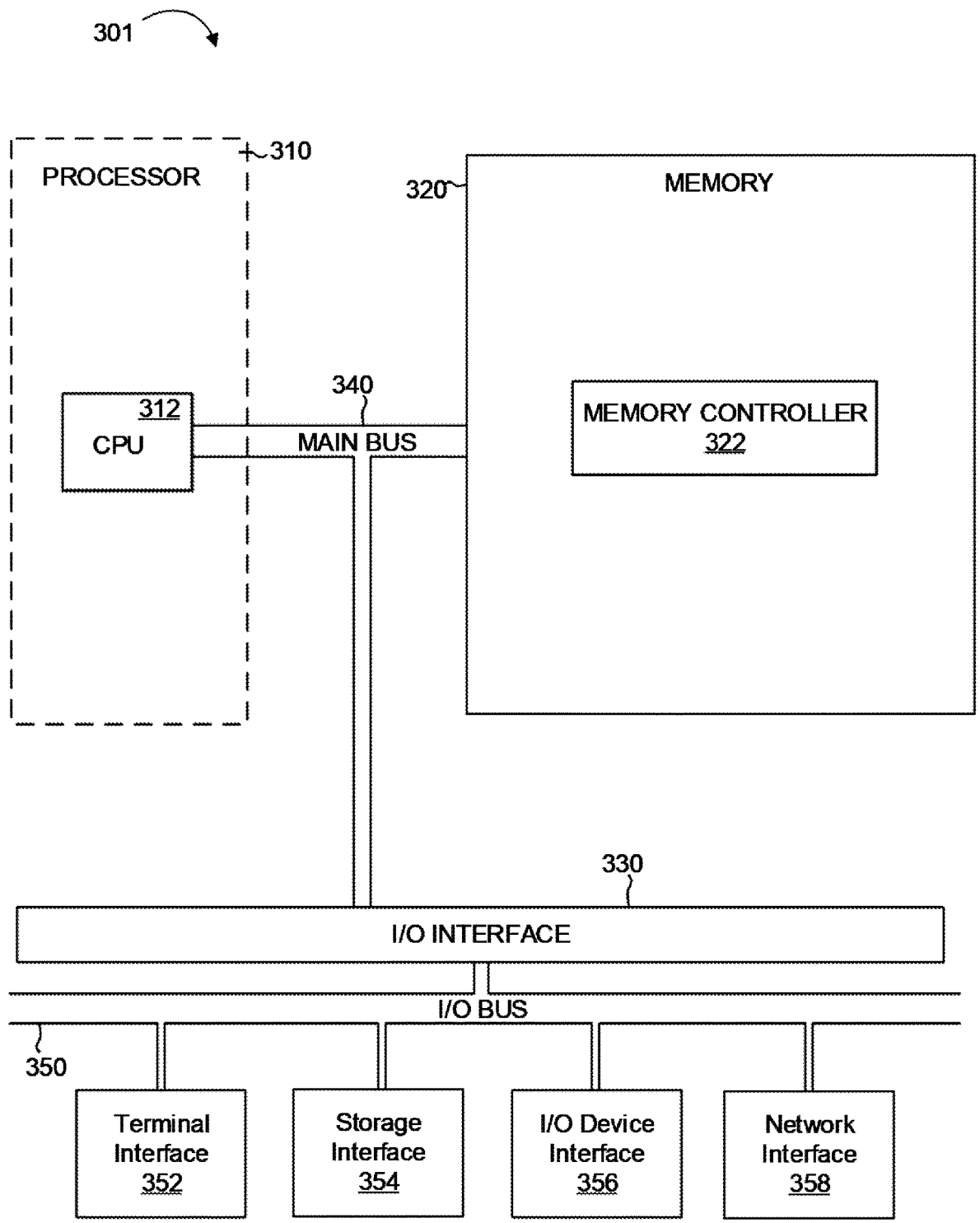
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
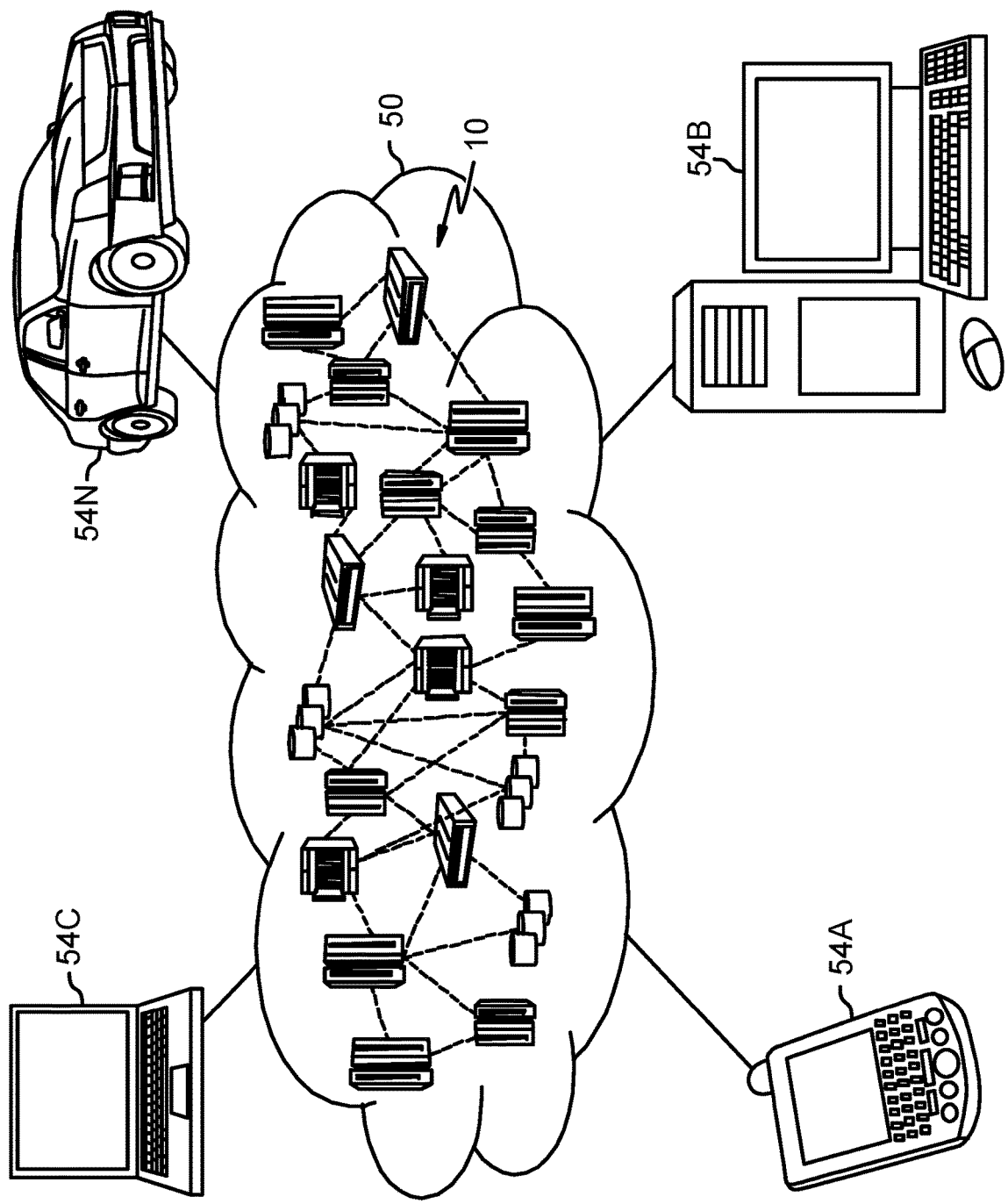
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
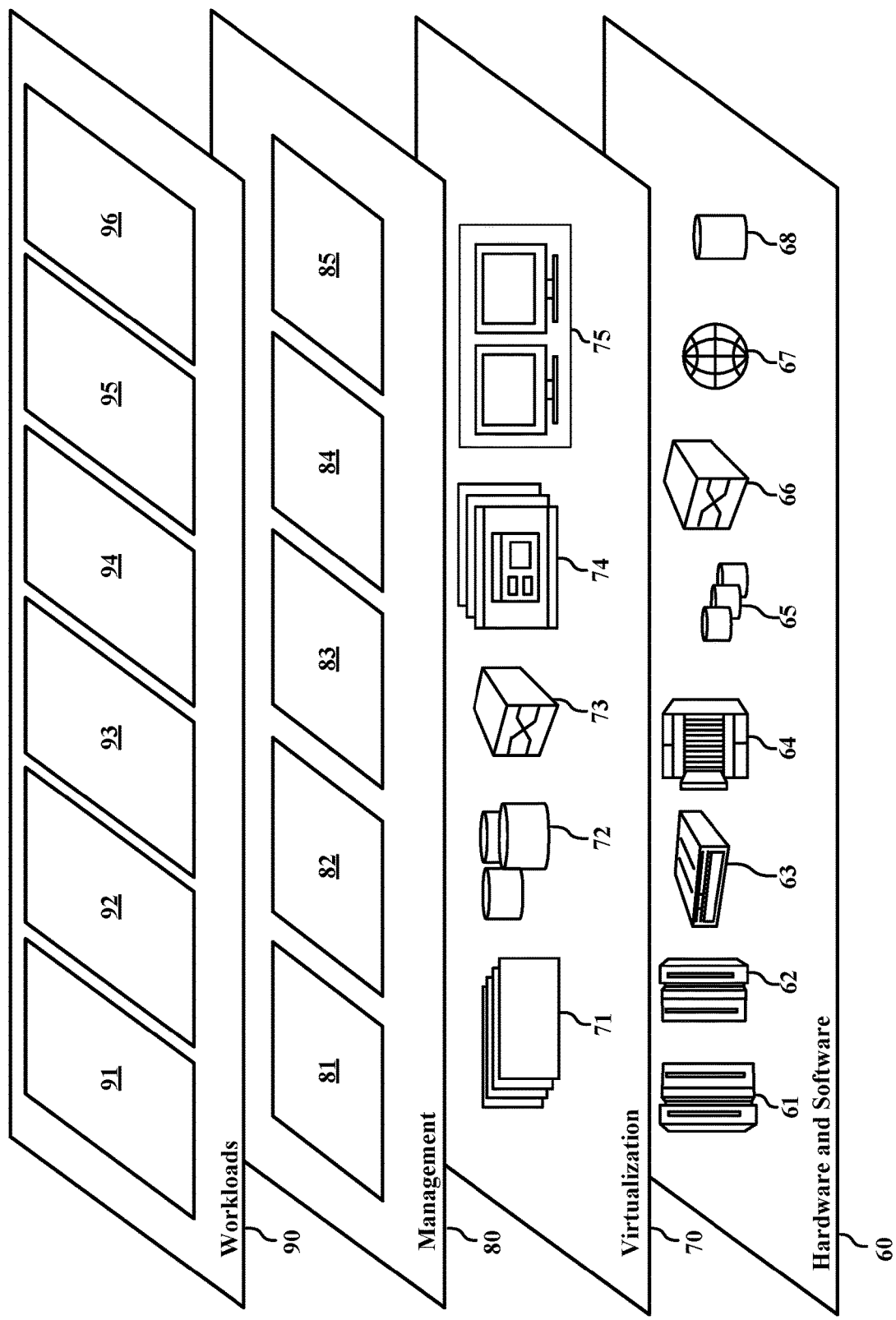
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and backup power allocation management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining device data for a set of electronic devices, the device data indicating an electrical load placed on a backup power source by the set of electronic devices;
obtaining a capacity of the backup power source configured to supply power to the set of electronic devices;
obtaining priority data corresponding to an allocation of power to the set of electronic devices;
obtaining a set of environmental conditions, wherein the set of environmental conditions include at least one of a quantity of sunlight, a velocity of wind, or a velocity of water available to the backup power source;
calculating, based at least in part on the set of environmental conditions and the device data, a projected power capacity of the backup power source;
determining that one or more thresholds are exceeded, the determining comprising identifying that the projected power capacity exceeds a first threshold; and
modifying, in response to the determining and according to the priority data, power supplied to the set of electronic devices from the backup power source.

2. The computer-implemented method of claim 1, wherein the set of electronic devices comprises a first server and a second server,
wherein the priority data comprises a first priority rating of the first server and a second priority rating of the second server, the first priority rating indicating a higher degree of priority than the second priority rating, and
wherein the modifying comprises reducing, in response to the first server having the first priority rating, a processing speed of the first server.

3. The computer-implemented method of claim 2, wherein the modifying further comprises, powering off the second server in response to the second server having the second priority rating.

4. The computer-implemented method of claim 1, wherein the device data indicates the electrical load placed on the backup power source by the plurality of electronic devices at a specific humidity measurement or a specific ambient temperature measurement.

5. The computer-implemented method of claim 1, wherein the set of electronic devices comprises a refrigerator,
wherein the determining further comprises identifying that an internal temperature of the refrigerator exceeds a temperature threshold,
and wherein the modifying comprises decreasing the internal temperature.

6. The computer-implemented method of claim 1, wherein the backup power source is selected from the group consisting of: a battery, a fuel generator, a solar panel, and a turbine.

7. The computer-implemented method of claim 1, wherein the set of electronic devices comprises a first device and a second device,
wherein the modifying comprises increasing, based at least in part on the set of environmental conditions, a first quantity of power supplied to the first device from the backup power source, and
wherein the modifying further comprises decreasing, based at least in part on the set of environmental conditions, a second quantity of power supplied to the second device from the backup power source.

8. A system comprising:
one or more processors; and
one or more computer-readable storage media storing program instructions which, when executed by the one or more processors, are configured to cause the one or more processors to perform a method comprising:
obtaining device data for a set of electronic devices, the device data indicating an electrical load placed on a backup power source by the set of electronic devices;
obtaining a capacity of a backup power source configured to supply power to the set of electronic devices;
obtaining priority data corresponding to an allocation of power to the set of electronic devices;
obtaining a set of environmental conditions, wherein the set of environmental conditions include at least one of a quantity of sunlight, a velocity of wind, or a velocity of water available to the backup power source;
calculating, based at least in part on the set of environmental conditions and the device data, a projected power capacity of the backup power source;
determining that one or more thresholds are exceeded, the determining comprising identifying that the projected power capacity exceeds a first threshold; and
modifying, in response to the determining and according to the priority data, power supplied to the set of electronic devices from the backup power source.

9. The system of claim 8, wherein the set of electronic devices comprises a first server and a second server,
wherein the priority data comprises a first priority rating of the first server and a second priority rating of the second server, the first priority rating indicating a higher degree of priority than the second priority rating, and
wherein the modifying comprises reducing, in response to the first server having the first priority rating, a processing speed of the first server.

10. The system of claim 9, wherein the modifying further comprises, powering off the second server in response to the second server having the second priority rating.

11. The system of claim 8, wherein the device data indicates the electrical load placed on the backup power source by the plurality of electronic devices at =a specific humidity measurement or a specific ambient temperature measurement.

12. The system of claim 8, wherein the set of electronic devices comprises a refrigerator,
wherein the determining further comprises identifying that an internal temperature of the refrigerator exceeds a temperature threshold,
and wherein the modifying comprises decreasing the internal temperature.

13. The system of claim 8, wherein the backup power source is selected from the group consisting of: a battery, a fuel generator, a solar panel, and a turbine.

14. The system of claim 8, wherein the set of electronic devices comprises a first device and a second device,
wherein the modifying comprises increasing, based at least in part on the set of environmental conditions, a first quantity of power supplied to the first device from the backup power source, and
wherein the modifying further comprises decreasing, based at least in part on the set of environmental conditions, a second quantity of power supplied to the second device from the backup power source.

15. A computer program product comprising one or more computer readable storage media, and program instructions collectively stored on the one or more computer readable storage media, the program instructions executable by one or more processors to cause the one or more processors to perform a method comprising:
- obtaining device data for a set of electronic devices, the device data indicating an electrical load placed on a backup power source by the set of electronic devices;
- obtaining a capacity of a backup power source configured to supply power to the set of electronic devices;
- obtaining priority data corresponding to an allocation of power to the set of electronic devices;
- obtaining a set of environmental conditions, wherein the set of environmental conditions include at least one of a quantity of sunlight, a velocity of wind, or a velocity of water available to the backup power source;
- calculating, based at least in part on the set of environmental conditions and the device data, a projected power capacity of the backup power source;
- determining that one or more thresholds are exceeded, the determining comprising identifying that the projected power capacity exceeds a first threshold; and
- modifying, in response to the determining and according to the priority data, power supplied to the set of electronic devices from the backup power source.

16. The computer program product of claim 15, wherein the set of electronic devices comprises a first server and a second server,
- wherein the priority data comprises a first priority rating of the first server and a second priority rating of the second server, the first priority rating indicating a higher degree of priority than the second priority rating, and
- wherein the modifying comprises reducing, in response to the first server having the first priority rating, a processing speed of the first server.

17. The computer program product of claim 16, wherein the modifying further comprises, powering off the second server in response to the second server having the second priority rating.

18. The computer program product of claim 15, wherein the device data indicates the electrical load placed on the backup power source by the plurality of electronic devices at a specific humidity measurement or a specific ambient temperature measurement.

19. The computer program product of claim 15, wherein the set of electronic devices comprises a refrigerator,
- wherein the determining further comprises identifying that an internal temperature of the refrigerator exceeds a temperature threshold,
- and wherein the modifying comprises decreasing the internal temperature.

20. The computer program product of claim 15, wherein the backup power source is selected from the group consisting of: a battery, a fuel generator, a solar panel, and a turbine.

21. A computer-implemented method comprising:
- obtaining device data for a set of electronic devices, the device data indicating an electrical load placed on a set of solar panels by the set of electronic devices;
- obtaining a capacity of the set of solar panels configured to supply power to the set of electronic devices;
- obtaining priority data corresponding to an allocation of power to the set of electronic devices;
- obtaining a weather forecast, wherein the weather forecast includes a projected amount of sunlight available to the set of solar panels;
- calculating, based at least in part on the weather forecast and the device data, a projected power capacity of the set of solar panels;
- determining that the projected power capacity exceeds a threshold; and
- modifying, in response to the determining and according to the priority data, power supplied to the set of electronic devices from the set of solar panels.

* * * * *